US008543265B2

(12) United States Patent  (10) Patent No.: US 8,543,265 B2
Ekhaguere et al.  (45) Date of Patent: Sep. 24, 2013

(54) SYSTEMS AND METHODS FOR UNMANNED AERIAL VEHICLE NAVIGATION

(75) Inventors: David E. Ekhaguere, Albuquerque, NM (US); Rick E. Annati, Albuquerque, NM (US); Derick L. Gerlock, Albuquerque, NM (US); Douglas Birkel, Cambridge (GB)

(73) Assignee: Honeywell International Inc., Morristown, NJ (US)

( * ) Notice: Subject to any disclaimer, the term of this patent is extended or adjusted under 35 U.S.C. 154(b) by 774 days.

(21) Appl. No.: 12/254,158

(22) Filed: Oct. 20, 2008

(65) Prior Publication Data

US 2010/0100269 A1   Apr. 22, 2010

(51) Int. Cl.
*G05D 1/10* (2006.01)

(52) U.S. Cl.
USPC .............................................. 701/11; 701/423

(58) Field of Classification Search
USPC ............. 701/2, 3, 4, 11, 23, 25, 26, 120, 121, 701/122, 200, 201, 206, 209, 210, 301, 412, 701/414, 423, 483; 340/903, 961; 244/3.15, 244/3.16, 75.1, 76
See application file for complete search history.

(56) References Cited

U.S. PATENT DOCUMENTS

| | | | |
|---|---|---|---|
| 5,152,478 A * | 10/1992 | Cycon et al. .................. | 244/12.2 |
| 5,581,250 A | 12/1996 | Khvilivitzky ................. | 340/961 |
| 5,890,441 A | 4/1999 | Swinson et al. .............. | 244/12.3 |
| 6,377,875 B1 | 4/2002 | Schwaerzler .................... | 701/2 |
| 6,650,407 B2 | 11/2003 | Jamieson et al. ........... | 356/141.1 |
| 6,804,607 B1 * | 10/2004 | Wood .............................. | 701/301 |
| 6,819,982 B2 | 11/2004 | Doane ............................... | 701/3 |
| 6,976,653 B2 | 12/2005 | Perlo et al. ..................... | 244/12.2 |
| 7,061,401 B2 * | 6/2006 | Voos et al. ..................... | 340/961 |
| 7,228,232 B2 | 6/2007 | Bodin et al. ................... | 701/301 |
| 7,269,513 B2 | 9/2007 | Herwitz ........................ | 701/301 |

(Continued)

FOREIGN PATENT DOCUMENTS

| | | | |
|---|---|---|---|
| GB | 2441643 A | * | 3/2008 |
| JP | 2003127997 A | | 5/2003 |
| JP | 2003288700 A | | 10/2003 |
| JP | 2010036890 A | * | 2/2010 |

OTHER PUBLICATIONS

Lacher, Andrew R. et al., Conference paper: "Unmanned aircraft collision avoidance-technology assessment and evaluation methods", 7th USA/Europe Air Traffic Management Research and Development Seminar, 7th ATM Seminar, Jul. 2-5, 2007, Barcelona, Spain, 10 pages.*

(Continued)

*Primary Examiner* — James Trammell
*Assistant Examiner* — David Testardi
(74) *Attorney, Agent, or Firm* — Shumaker & Sieffert, P.A.

(57) ABSTRACT

Systems and methods for unmanned aerial vehicle (UAV) navigation are presented. In a preferred embodiment, a UAV is configured with at least one flight corridor and flight path, and a first UAV flight plan is calculated. During operation of the first UAV flight plan, the UAV visually detects an obstacle, and calculates a second UAV flight plan to avoid the obstacle. Furthermore, during operation of either the first or the second UAV flight plan, the UAV acoustically detects an unknown aircraft, and calculates a third UAV flight plan to avoid the unknown aircraft. Additionally, the UAV may calculate a new flight plan based on other input, such as information received from a ground control station.

11 Claims, 7 Drawing Sheets

(56) References Cited

U.S. PATENT DOCUMENTS

| | | | |
|---|---|---|---|
| 7,307,579 B2 | 12/2007 | Rees et al. | 342/29 |
| 7,343,232 B2 | 3/2008 | Duggan et al. | 701/24 |
| 7,451,023 B2* | 11/2008 | Appleby et al. | 701/24 |
| 7,606,115 B1* | 10/2009 | Cline et al. | 367/124 |
| 7,737,878 B2* | 6/2010 | van Tooren et al. | 342/29 |
| 7,864,096 B2* | 1/2011 | Stayton et al. | 342/29 |
| 7,876,258 B2* | 1/2011 | Abraham et al. | 342/29 |
| 7,970,532 B2* | 6/2011 | Tehan et al. | 701/423 |
| 2004/0141170 A1 | 7/2004 | Jamieson et al. | 356/5.01 |
| 2005/0082421 A1 | 4/2005 | Perlo et al. | 244/12.2 |
| 2006/0058931 A1 | 3/2006 | Ariyur et al. | 701/23 |
| 2006/0235584 A1 | 10/2006 | Fregene et al. | 701/23 |
| 2007/0023582 A1 | 2/2007 | Steele et al. | 244/190 |
| 2007/0067050 A1 | 3/2007 | Fregene et al. | 700/31 |
| 2007/0078600 A1 | 4/2007 | Fregene et al. | 701/301 |
| 2007/0088491 A1 | 4/2007 | He | 701/120 |
| 2007/0093945 A1* | 4/2007 | Grzywna et al. | 701/23 |
| 2007/0093946 A1 | 4/2007 | Gideoni | 701/24 |
| 2007/0131822 A1 | 6/2007 | Stallard | 244/190 |
| 2007/0210953 A1 | 9/2007 | Abraham et al. | 342/29 |
| 2007/0222665 A1 | 9/2007 | Koeneman | 342/29 |
| 2007/0252029 A1 | 11/2007 | Karem | 244/1 |
| 2007/0284474 A1 | 12/2007 | Olson et al. | 244/10 |
| 2008/0027647 A1 | 1/2008 | Ansell et al. | 701/301 |
| 2008/0033604 A1 | 2/2008 | Margolin | 701/2 |
| 2008/0169962 A1 | 7/2008 | Rees et al. | 342/29 |
| 2009/0210109 A1* | 8/2009 | Ravenscroft | 701/26 |
| 2010/0121574 A1* | 5/2010 | Ariyur et al. | 701/301 |
| 2010/0121575 A1* | 5/2010 | Aldridge et al. | 701/301 |

OTHER PUBLICATIONS

Lacher, Andrew R., Conference presentation: "Unmanned aircraft collision avoidance-technology assessment and evaluation methods", 7th USA/Europe Air Traffic Management Research and Development Seminar, 7th ATM Seminar, Jul. 2-5, 2007, Barcelona, Spain, 26 pages.*

JPO machine translation of JP 2010-36890 A.*

Office Action (and translation) from counterpart Japanese application No. 2009-190055, dated Jul. 17, 2013, 5 pp.

* cited by examiner

SYSTEMS AND METHODS FOR UNMANNED AERIAL VEHICLE NAVIGATION

GOVERNMENT RIGHTS

The United States Government may have acquired certain rights in this invention pursuant to Contract No. W56HZV-05-C-0724 with the United States Army.

FIELD

The embodiments herein relate to systems and methods for navigation of unmanned aerial vehicles (UAVs).

BACKGROUND

A UAV is a remotely piloted or self-piloted aircraft that can carry cameras, sensors, communications equipment, or other payloads, is capable of controlled, sustained, level flight, and is usually powered by an engine. A self-piloted UAV may fly autonomously based on pre-programmed flight plans.

UAVs are becoming increasingly used for various missions where manned flight vehicles are not appropriate or not feasible. These missions may include military situations, such as surveillance, reconnaissance, target acquisition, data acquisition, communications relay, decoy, harassment, or supply flights. UAVs are also used for a growing number of civilian missions where a human observer would be at risk, such as firefighting, natural disaster reconnaissance, police observation of civil disturbances or crime scenes, and scientific research. An example of the latter would be observation of weather formations or of a volcano.

As miniaturization technology has improved, it is now possible to manufacture very small UAVs (sometimes referred to as micro-aerial vehicles, or MAVs). For examples of UAV and MAV design and operation, see U.S. patent application Ser. Nos. 11/752,497, 11/753,017, and 12/187,172, all of which are hereby incorporated by reference in their entirety herein.

A UAV can be designed to use a ducted fan for propulsion, and may fly like a helicopter, using a propeller that draws in air through a duct to provide lift. The UAV propeller is preferably enclosed in the duct and is generally driven by a gasoline engine. The UAV may be controlled using microelectrical mechanical systems (MEMS) electronic sensor technology.

Traditional aircraft may utilize a dihedral wing design, in which the wings exhibit an upward angle from lengthwise axis of the aircraft when the wings are viewed from the front or rear of this axis. A ducted fan UAV may lack a dihedral wing design and, therefore, it may be challenging to determine which direction a ducted fan UAV is flying. Consequently, it can be difficult for both manned and unmanned vehicles to avoid collisions with such a UAV. As UAVs are more widely deployed, the airspace will become more crowded. Thus, there is an increasing need to improve UAV collision avoidance systems.

SUMMARY

In order to improve UAV navigation, a UAV may be configured with data representing at least one flight corridor and at least one flight path. A first flight plan may be calculated to avoid the flight corridor and the flight path by navigating around, over or under the locations of these items. During the course of the UAV's operation of the first flight plan, the UAV may detect, for example via a camera, an obstacle within the UAV's flight plan or in the vicinity of the UAV's flight plan. Consequently, a second flight plan may be calculated to avoid the obstacle as well as flight corridors and flight paths.

In a further embodiment, the UAV may also use acoustic input to detect nearby unknown aircraft and respond by calculating a new flight plan to avoid the detected unknown aircraft. Additionally, the UAV may receive transmissions from a friendly UAV or manned vehicle that indicate the location and/or vector of an obstacle. The UAV may respond by calculating a new flight plan to avoid the obstacle. These UAV navigation mechanisms may be performed autonomously by the UAV or in conjunction with input from one or more ground control stations.

In general, the UAV may utilize multiple input modes (e.g., manual, optical, acoustic, thermal, and/or electronic means) to make flight plan calculations and adjustments. This multi-modal navigation logic may be pre-configured in the UAV, or may be dynamically uploaded to the UAV.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

Figure 1:
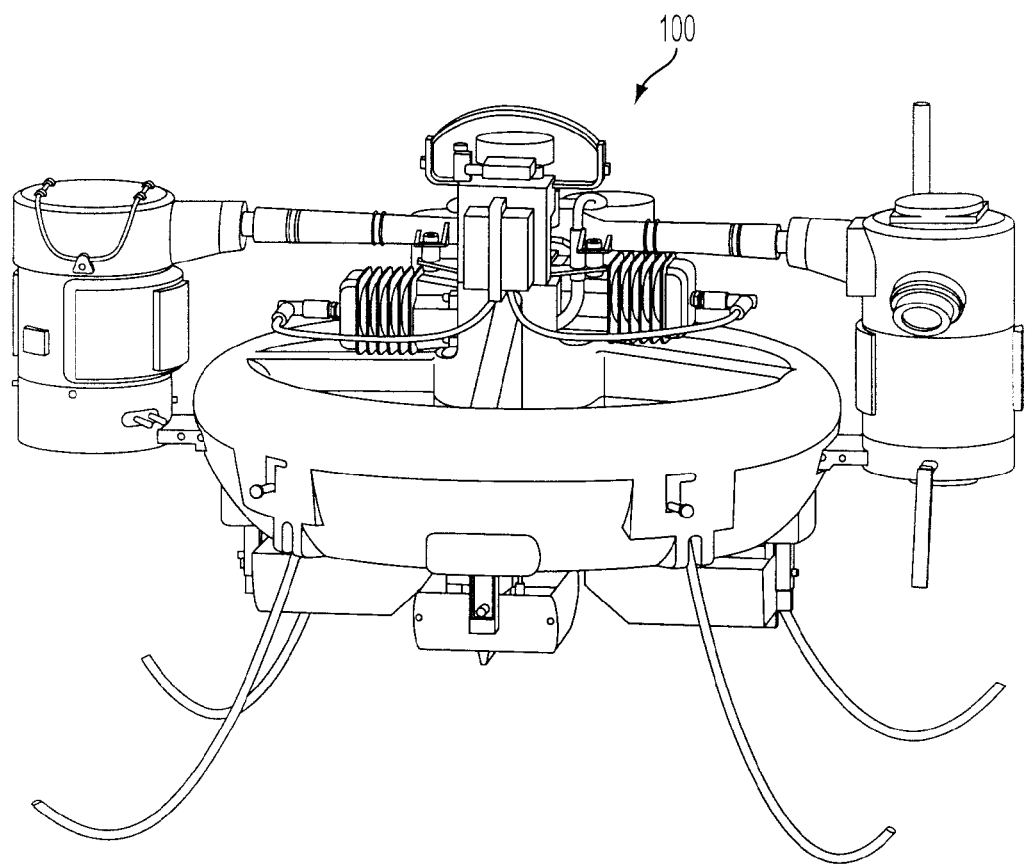
FIG. 1 is a diagram of an example UAV design.

FIG. 1 depicts an example UAV 100 (a Honeywell RQ-16 Micro-Air Vehicle (MAV) is shown). UAV 100 may be used for reconnaissance, surveillance and target acquisition (RSTA) missions. For example, UAV 100 may launch and execute an RSTA mission by flying to one or more waypoints according to a flight plan before arriving at a landing position. Once launched, UAV 100 can perform such a UAV flight plan autonomously or with varying degrees of remote operator guidance from one or more ground control stations. UAV 100 may be a hovering ducted fan UAV, but alternative UAV embodiments can also be used.

UAV 100 may include one or more active or passive sensors, such as a video camera or an acoustic sensor. In alternative embodiments, different types of sensors may be used in addition to the video camera and/or the acoustic sensor, such as motion sensors, heat sensors, wind sensors, RADAR, LADAR, electro-optical (EO), non-visible-light sensors (e.g. infrared (IR) sensors), and/or EO/IR sensors. Furthermore, multiple types of sensors may be utilized in conjunction with one another in accordance with multi-modal navigation logic. Different types of sensors may be used depending on the characteristics of the intended UAV mission and the environment in which the UAV is expected to operate.

UAV 100 may also comprise a processor and a memory coupled to these sensors and other input devices. The memory is preferably configured to contain static and/or dynamic data, including the UAV's flight plan, flight corridors, flight paths, terrain maps, and other navigational information. The memory may also contain program instructions, executable by the processor, to conduct flight operations, and other operations, in accordance with the methods disclosed herein.

Generally speaking, UAV 100 may be programmed with a UAV flight plan that instructs UAV 100 to fly between a number of waypoints in a particular order, while avoiding certain geographical coordinates, locations, or obstacles. For example, if UAV 100 is flying in the vicinity of a commercial, civilian or military flight corridor, UAV 100 should avoid flying in this corridor during the flight corridor's hours of operation. Similarly, if UAV 100 is programmed with a flight path of a manned aircraft or another UAV, UAV 100 should adjust its UAV flight plan avoid this flight path. Additionally, if UAV 100 is flying according to its UAV flight plan and UAV 100 encounters a known or previously unknown obstacle, UAV 100 should adjust its UAV flight plan to avoid the obstacle.

Herein, the term "flight plan" generally refers to the planned path of flight of a UAV, such as UAV 100, while the term "flight path" generally refers to an observed or planned path of flight of another aerial vehicle that the UAV may encounter. However, these terms may otherwise be used interchangeably.

Figure 2:
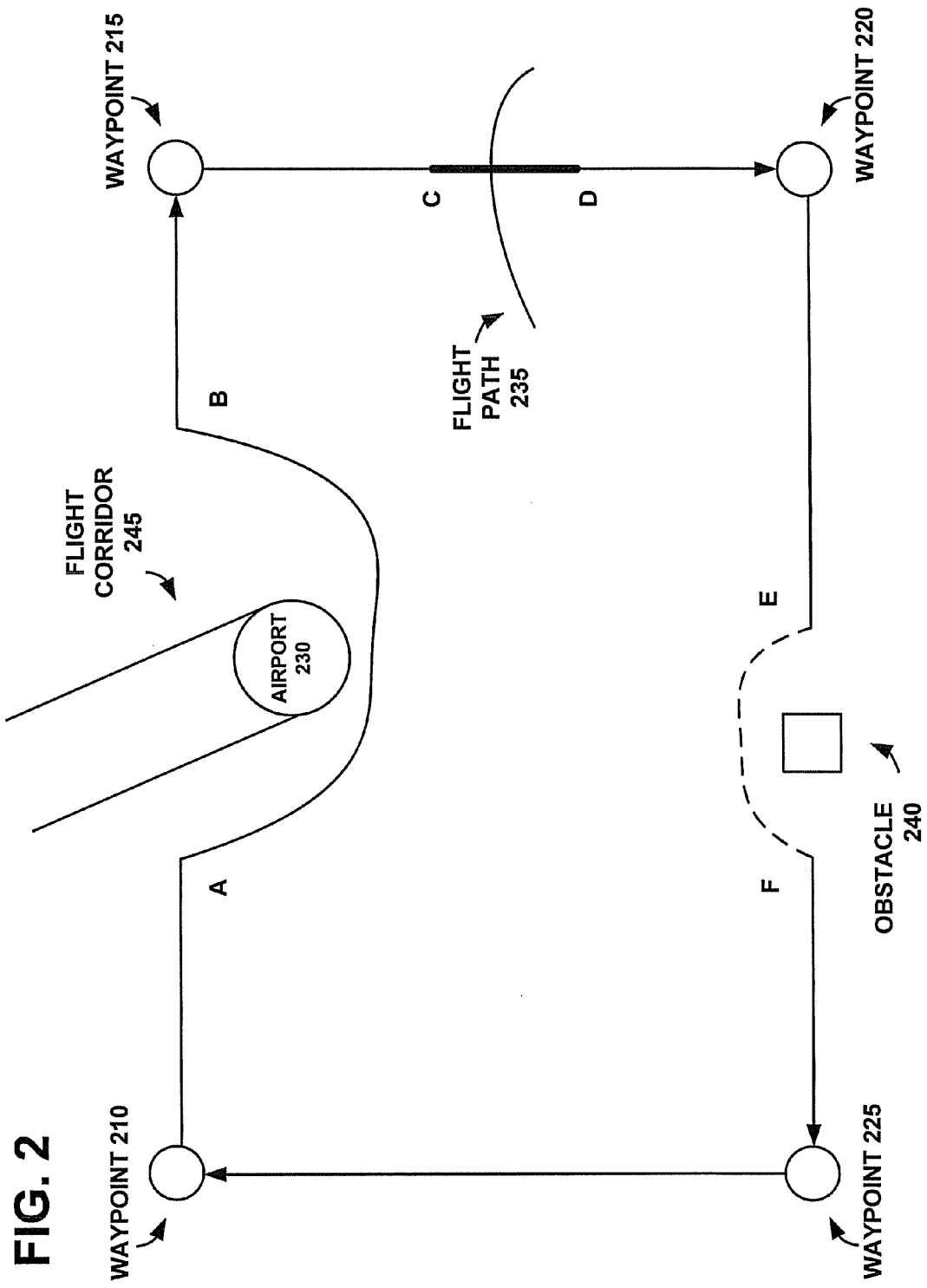
FIG. 2 depicts an example of a UAV flight plan that avoids interference with various ground-based and aerial objects and obstacles.

FIG. 2 depicts a UAV flight according to a UAV flight plan, where the UAV, for example UAV 100, calculates the UAV flight plan in order to avoid a flight corridor and another aircraft's flight path. In doing so, the UAV preferably makes use of multi-modal logic and input from at least two sources. The UAV flight plan may later be adjusted (or a new flight plan may be calculated) to avoid an obstacle. This adjustment or recalculation also preferably uses multi-modal logic.

The UAV flight plan depicted in FIG. 2 includes four waypoints. It is assumed that UAV 100 begins at waypoint 210, proceeds to waypoint 215, then to waypoint 220, and finally to waypoint 225 before returning to waypoint 210. However, these four waypoints and this UAV flight plan are merely examples. An actual UAV flight plan may contain more or fewer waypoints, and the paths between these waypoints may be more or less direct than is depicted in FIG. 2.

UAV 100 may comprise an on-board global positioning system (GPS) for determining its location and velocity, and for adjusting its UAV flight plan. However, UAV 100 may use other types of position-determining equipment instead of or along with a GPS in order to navigate.

Presumably, UAV 100 is pre-configured with information regarding airport 230, flight corridor 245 and flight path 235. Alternatively, this information may be uploaded to UAV 100 during flight planning or dynamically transmitted to UAV 100 during flight. UAV 100 may not, however, contain information regarding obstacle 240. Thus, UAV 100 may be able to calculate a first UAV flight plan that avoids airport 230, flight corridor 245 and flight path 235, but UAV 100 may need to dynamically adjust its UAV flight plan to avoid obstacle 240.

For example, based on the first UAV flight plan and input from one or more of its sensors, UAV 100 may calculate a second UAV flight plan to avoid obstacle 240. Alternatively, UAV 100 may dynamically adjust or recalculate its UAV flight plan to avoid airport 230, flight corridor 245, flight path 235 and obstacle 240. Furthermore, UAV 100 may adjust its UAV flight plan based on input from a ground control station as well.

Regardless of exactly how UAV 100 is arranged to operate, adjust, or recalculate its UAV flight plan, when UAV 100 reaches point A, UAV 100 determines that it needs to avoid flight corridor 245. A flight corridor, or airway, is typically airspace that military, commercial, or civilian aircraft may use. A flight corridor may be thought of as a three dimensional highway above the ground in which aircraft may fly. These aircraft may or may not be under directions from a control tower while in the flight corridor. A flight corridor is preferably specified by a vector, a width, one or more altitudes or a range of altitudes, and a range of time. For example, flight corridor 245 might be specified by a vector of 305 degrees, a width of 10 nautical miles, a range of altitudes from 0 (zero) to 10,000 feet, and a range of time from 06:00 hours to 14:00 hours (6 AM to 2 PM). However, a flight corridor can be specified using more or fewer factors.

The range of time preferably specifies the hours of the day during which flight corridor 245 will be in use. Presumably, flight corridor 245 will not be used by any aircraft outside of this range of hours, and therefore UAV 100 could safely intersect flight corridor 245 outside of this range of hours.

When approaching point A, UAV 100 determines that it is about to intersect flight corridor 245. Preferably, UAV 100 compares the current time to the range of time for flight corridor 245. If the current time is within the range of time for flight corridor 245, UAV 100 determines that it should avoid flight corridor 245. As depicted in FIG. 2, UAV 100 may fly around flight corridor 245 and nearby airport 230. Alternatively, UAV 100 may determine that it can change altitude to avoid flight corridor 245. Preferably, UAV avoids flight corridor 245 and airport 230 by some number of nautical miles, or by some thousands of feet in altitude.

At point B, UAV 100 has passed flight corridor 245 and airport 230, and has re-acquired its original vector towards waypoint 215. However, UAV 100 need not re-acquire this vector, and may proceed to waypoint 215 in a more direct fashion.

Once at waypoint 215, UAV 100 changes direction and proceeds, according to its UAV flight plan, on a vector towards waypoint 220. At point C, UAV 100 determines that it may intersect flight path 235. Flight path 235 may be a pre-determined flight path of another UAV or a manned aircraft. Preferably, UAV 100 maintains its vector but changes altitude between point C and point D in order to avoid an aircraft flying according to flight path 235. However, UAV 100 may avoid flight path 235 in other ways.

At point D, UAV reverts to its previous altitude and proceeds according to its UAV flight plan to waypoint 220. Once at waypoint 220, UAV 100 changes direction and proceeds, according to its UAV flight plan, on a vector towards waypoint 225. At point E, UAV 100 senses obstacle 240. Obstacle 240 may have been previously unknown to UAV 100, and therefore UAV 100 may dynamically adjust its UAV flight plan to avoid obstacle 240. This adjustment may be autonomously determined and executed by UAV 100, or may be made in conjunction with input from the ground control station.

Furthermore, obstacle 240 may be a stationary object, or may be an object that is in motion either on the ground or in the air. For example, obstacle 240 might be an aircraft or a weather balloon. Alternatively, obstacle 240 may be a ground-based object, such as a building or a deployment of anti-aircraft artillery. Preferably UAV 100 detects obstacle 240 with its onboard video camera, but UAV 100 may use one or more other sensors to detect obstacle 240.

At point E, UAV 100 dynamically adjusts its UAV flight plan to avoid obstacle 240. For example, UAV 100 may fly around, over or under obstacle 240. At point F, UAV 100 re-acquires its original vector towards waypoint 225. Once at waypoint 225, UAV 100 changes direction and proceeds, according to its UAV flight plan, on a vector back to waypoint 210.

When, during, or after UAV 100 determines that it needs to change course for any reason, UAV 100 may transmit an alert to the ground control station indicating the course change. As part of this course change, UAV 100 may use its sensors, for example a video camera, to acquire new images of the nearby terrain. Thus, any of the maneuvers conducted by UAV 100 at point A, B, C, D, E, and/or F may be accompanied by communication between UAV 100 and a ground control station, as well as UAV 100 acquiring new images of nearby terrain.

In addition to avoiding flight corridors, flight paths and obstacles, UAV 100 may be configured to dynamically avoid unknown aircraft. An unknown aircraft might approach UAV 100 from such an angle that UAV 100 may be unable to detect the unknown aircraft with its video camera, or through other optical sensors. In order to detect unknown aircraft that might not be detected by the video camera or optical sensors, UAV 100 may be equipped with an acoustic sensor. Such an acoustic sensor is preferably capable of detecting engine noise and/or wind displacement noise associated with such an unknown aircraft.

The acoustic sensor may include one or more acoustic probes, and a digital signal processor. Preferably, the acoustic probes are configured to receive acoustic input signals and to remove noises associated wind and UAV vibration from these signals. Furthermore, the acoustic input signals may be converted into electrical form and represented digitally. The digital signal processor may filter the acoustic input signals to detect and/or track nearby aircraft, and may provide navigational input to other UAV components, such as the processor, so that UAV 100 may avoid the detected aircraft and/or maintain a safe distance from the detected aircraft. However, other types of acoustic or non-acoustic sensors may be used for this purpose.

Figure 3:
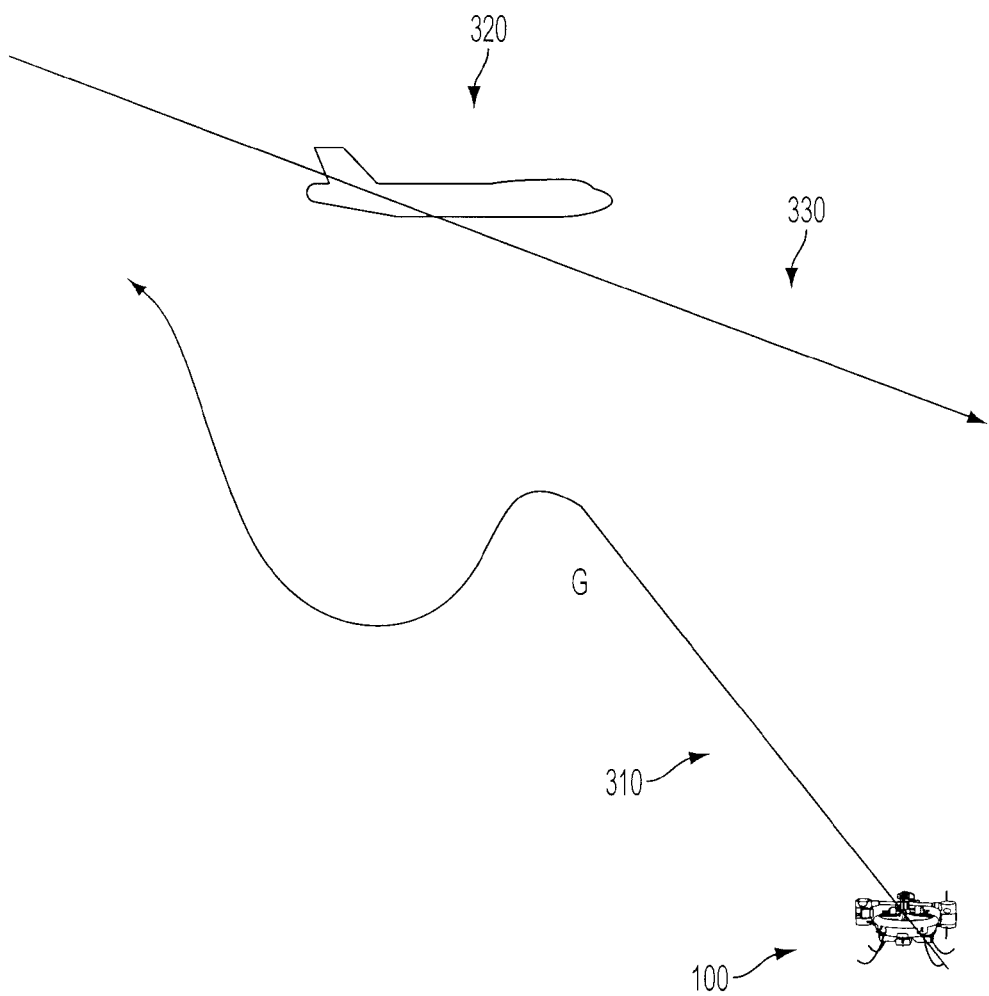
FIG. 3 depicts an example of a UAV detecting and avoiding an unknown aircraft.

FIG. 3 depicts an exemplary embodiment of a UAV, such as UAV 100, using acoustic sensor input to avoid an unknown aircraft. UAV 100 is flying according to UAV flight plan 310. At point G, UAV 100 detects unknown aircraft 320. UAV 100 may determine or estimate that unknown aircraft 320 is flying according to unknown aircraft vector 330. UAV 100 may then adjust its flight plan to avoid unknown aircraft 320. Preferably, UAV 100 detects unknown aircraft 320 via its acoustic sensors, but UAV 100 may take similar evasive measures in response to other types of input, such as EO or IR signals.

Furthermore, UAV 100 may communicate with other friendly UAVs, friendly manned aircraft, or ground control stations within its theater of operation in order to gather more information about its surroundings. For example, UAV 100 may receive information from a friendly UAV, manned aircraft, or ground control station about a previously unknown flight corridor, flight plan, flight path, obstacle, or another type of situational information, and UAV 100 may adjust its UAV flight plan accordingly. Additionally, UAV 100 may receive information from a friendly UAV, manned aircraft, or ground control station about an unknown aircraft in the vicinity and UAV 100 may adjust its flight plan to avoid the unknown aircraft. Preferably, UAV 100 will use any navigational input that it receives via any trusted source to determine, based on its mission's parameters, whether to make a dynamic change in its UAV flight plan.

Figure 4:
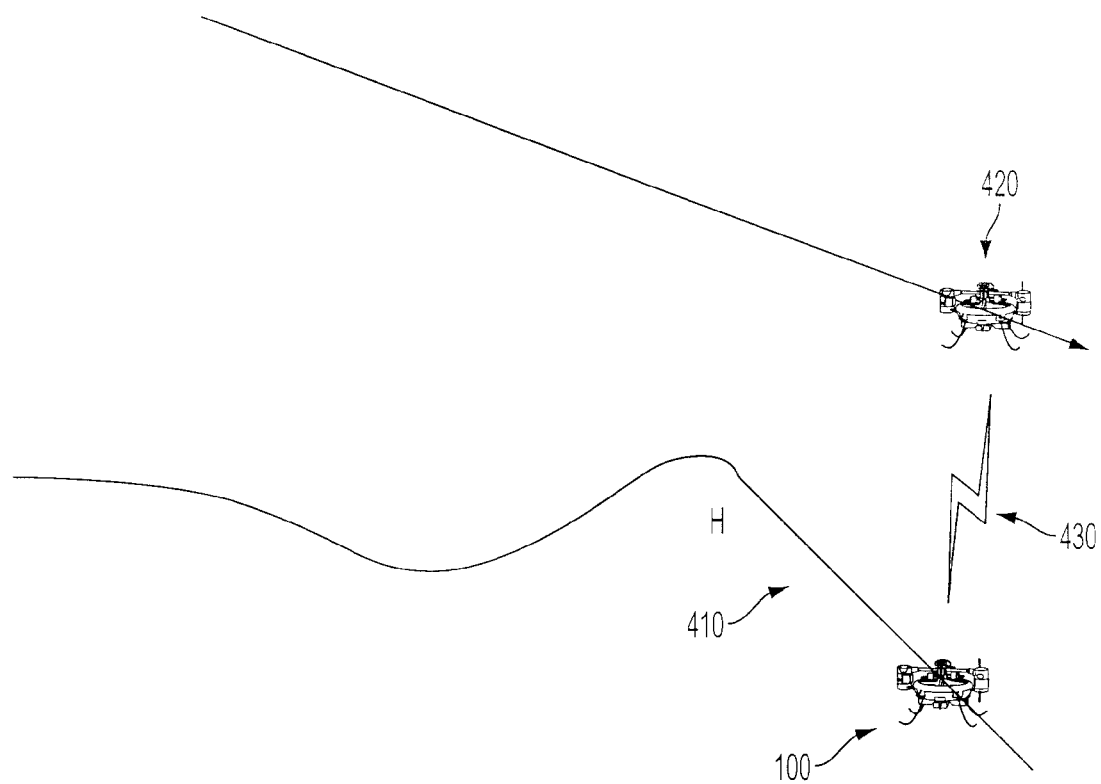
FIG. 4 depicts an example of a UAV calculating a new flight plan based on input from a friendly UAV.

FIG. 4 depicts a UAV, such as UAV 100, receiving input from a friendly UAV, and adjusting its UAV flight plan according to this input. Alternatively, UAV 100 may receive this input from a friendly manned aerial vehicle or a ground control station.

In FIG. 4, UAV 100 preferably flies according to UAV flight plan 410. At point H, UAV 100 receives input from friendly UAV 420. Preferably, UAV 100 receives this input via communication link 430, which may be a wireless communication link. Communication link 430 may operate according to various types of wireless technologies, including orthogonal frequency division multiplexing (OFDM), frequency hopping, or code division multiple access (CDMA). Preferably, communication link 430 is encrypted so that unauthorized listeners cannot decode transmissions between UAV 100 and friendly UAV 420. Furthermore, UAV 100 and friendly UAV 430 may communicate via point to point transmission transmissions directed to one another or via a broadcast system wherein other friendly UAVs (not shown) may also receive transmissions between UAV 100 and friendly UAV 420.

In response to receiving input from UAV 430, UAV 100 may adjust its UAV flight plan to take this input into account. For example, UAV 100 may calculate a new flight plan to avoid a flight corridor, flight path, obstacle, or unknown aircraft in its path. Additionally, UAV 100 may store the input received from friendly UAV 430 and later transmit this information to another friendly UAV over a communication link.

The methods, systems, and devices disclosed in FIGS. 2, 3, and 4 may be combined, in whole or part, with one another. For example, UAV 100 may be flying according to a UAV flight plan, as is depicted by FIG. 2, then detect and avoid an unknown aircraft, as is depicted in FIG. 3. Additionally, any time that UAV 100 determines that it needs to change course, UAV 100 may transmit an alert to the ground control station indicating the course change. In general, UAV 100 preferably applies multi-modal navigation logic, using input from multiple sources, to make determinations of how to conduct its mission.

Figure 5:
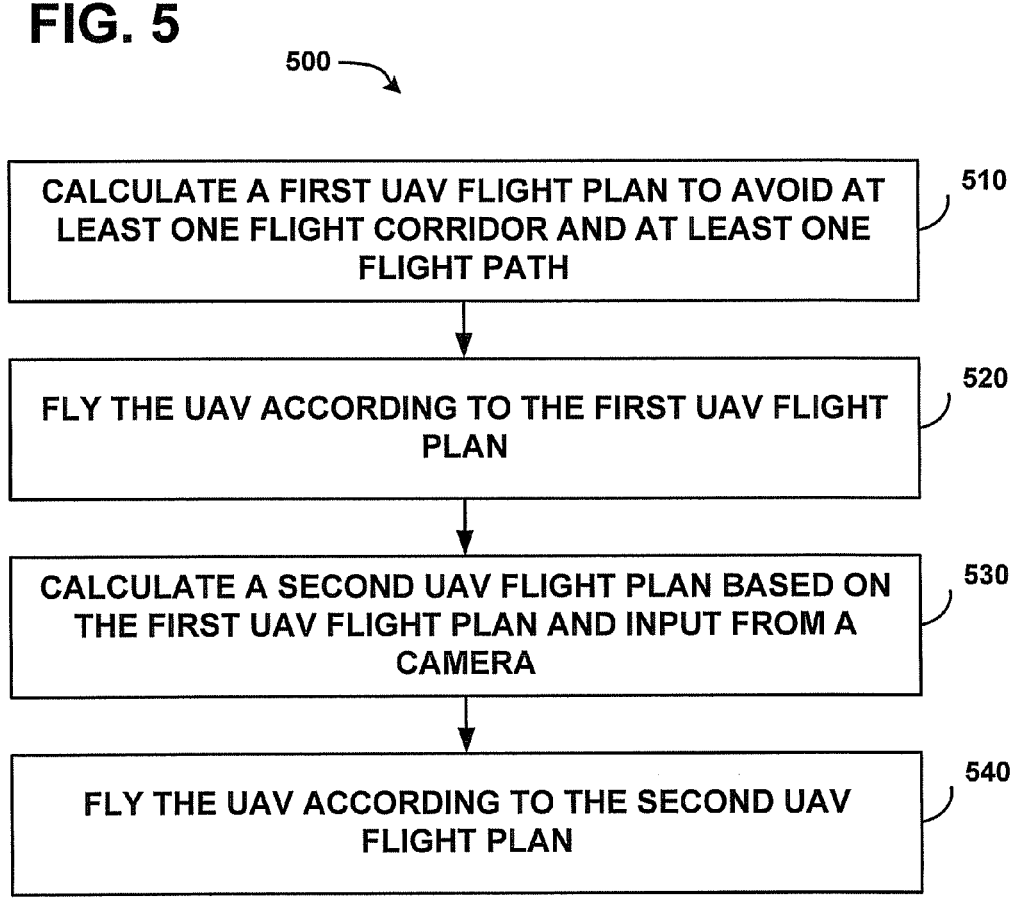
FIGS. 5, 6, and 7 are flow charts of methods in accordance with example embodiments.
Figure 6:
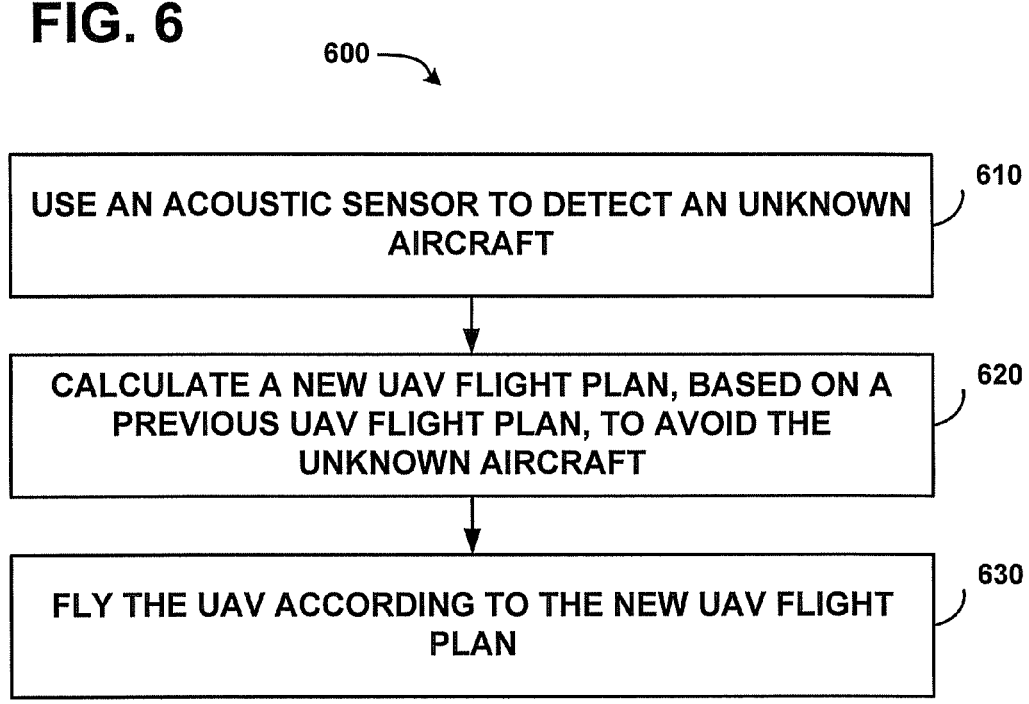
Figure 7:
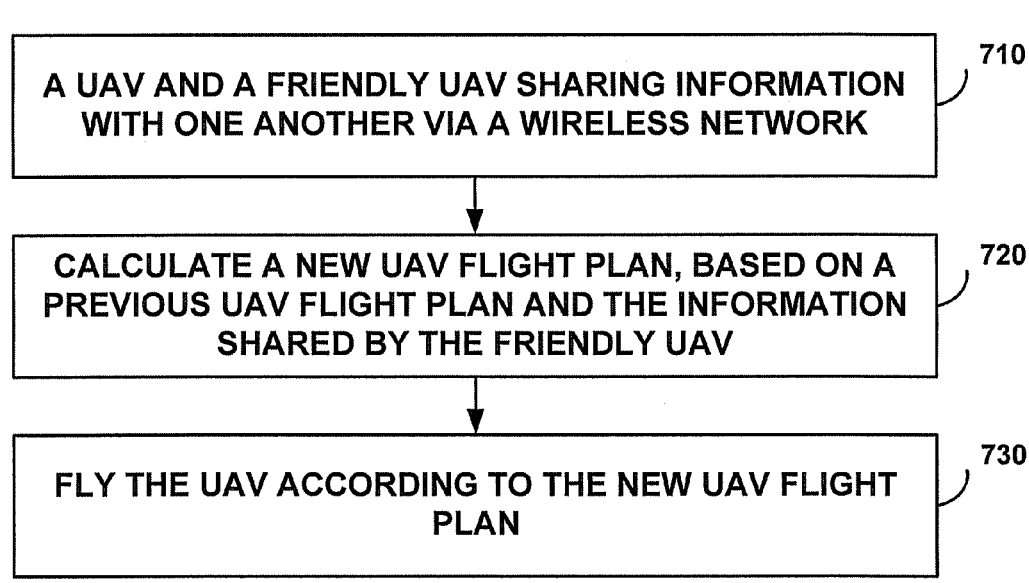

FIGS. 5, 6, and 7 depict flow charts of methods in accordance with exemplary embodiments of the present invention by representing respective sequences of steps or events. However, these steps or events may occur in a different order, and fewer or more steps or events may occur without departing from the scope of the embodiments. Moreover, the methods depicted in these flow charts may be combined with one another wholly or in part, to form additional embodiments that are also within the scope of this invention.

FIG. 5 depicts a flow chart of method 500. Method 500 provides a means to adjust a UAV flight plan based on input from a camera. At step 510, a first UAV flight plan is calculated to avoid at least one flight corridor and at least one flight path. The flight corridor may be, for example, a commercial flight corridor and may comprise one or more of a waypoint, a vector, a width centered upon the vector, and altitude range, and a time range. The flight path may be a flight path of a UAV or of a manned aircraft, and may also comprise one or more of a waypoint, a vector, a width centered upon the vector, and altitude range, and a time range.

At step 520, the UAV flies according to the first UAV flight plan. At step 530, based on the first UAV flight plan and input from a camera, a second UAV flight plan is calculated. The input from the camera may be, for example, navigational signals in visible light frequencies, navigational signals in infrared light frequencies, or other indications of a moving or stationary obstacle. Consequently, at step 540, the UAV flies according to the second flight plan. In particular, if the input from the camera indicates an obstacle, the second flight plan preferably avoids the obstacle. Method 500 may be carried out entirely by a UAV, such as UAV 100, or by a UAV in conjunction with a ground control station.

FIG. 6 depicts a flow chart of method 600. Method 600 may take place during or after the carrying out of method 500. At step 610, an acoustic sensor is used to detect an unknown aircraft. This unknown aircraft is likely to be in the vicinity of the UAV. At step 620, based on a previous UAV flight plan, such as the first UAV flight plan or the second UAV plan from method 500, a new UAV flight plan is calculated. The new UAV first plan preferably avoids the unknown aircraft, as well as any other obstacles, and may involve the UAV changing speed, direction, and/or altitude with respect to the previous UAV flight plan. Consequently, at step 630, the UAV flies according to the new UAV flight plan.

FIG. 7 depicts a flow chart of method 700. Method 700 may take place during or after the carrying out of method 500. At step 710, a UAV, such as UAV 100, and a friendly UAV share information with one another via a wireless network. The wireless network may be a point to point network between the UAV and the friendly UAV or a broadcast network. Transmissions between the UAV and the friendly UAV may pass back and forth over this network and may contain information regarding one or more flight corridors, flight plans, flight paths, obstacles, or unknown aircraft. At step 720, based on a previous UAV flight plan and the information shared by the friendly UAV, a new UAV flight plan is calculated. This new flight plan preferably avoids the one or more flight corridors, flight plans, flight paths, obstacles, or unknown aircraft that the UAV learned about from the friendly UAV. Consequently, at step 730, the UAV flies according to the new UAV flight plan.

Figure 8:
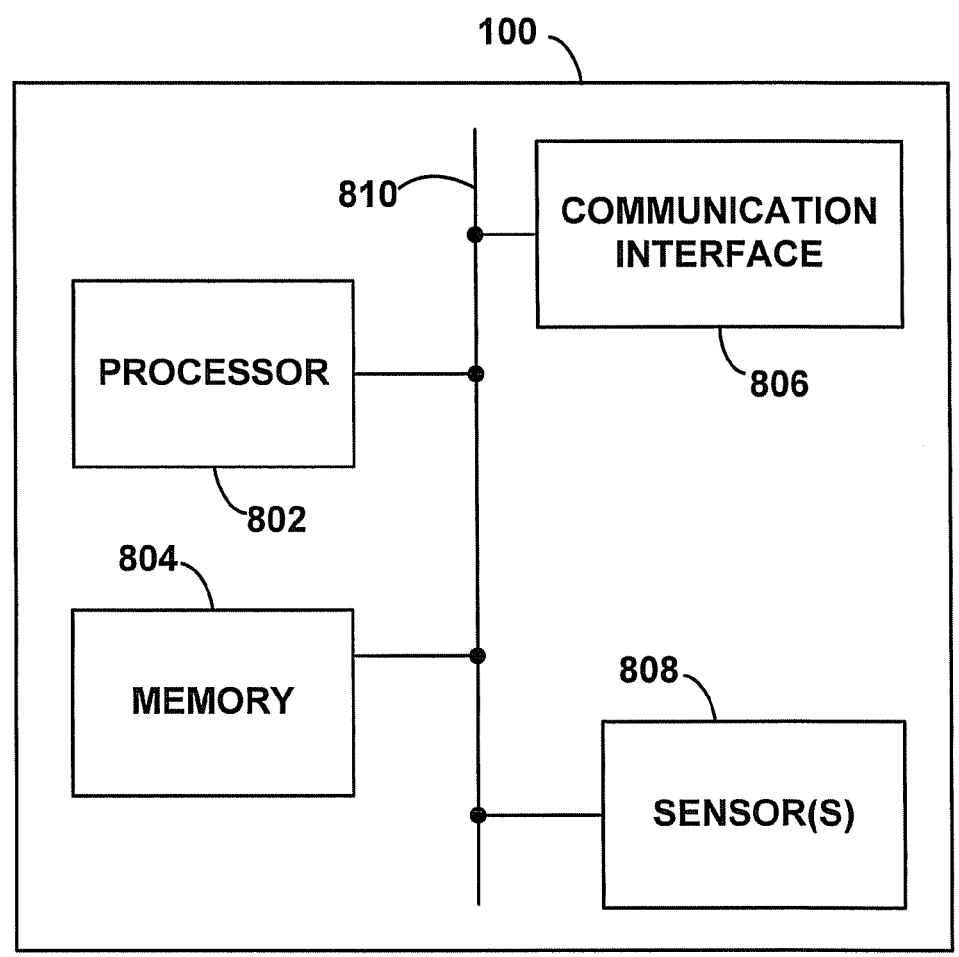
FIG. 8 is a block diagram depicting functional units that comprise an example UAV.

FIG. 8 is a simplified block diagram exemplifying UAV 100, and illustrating some of the functional components that would likely be found in a UAV arranged to operate in accordance with the embodiments herein. Although not shown in FIG. 8, the UAV may be a ducted fan UAV capable of vertical takeoff and landing. However, other UAV designs may be used.

Example UAV 100 preferably includes a processor 802, a memory 804, a communication interface 806, and one or more sensors 808, all of which may be coupled by a system bus 810 or a similar mechanism. Processor 802 preferably includes one or more CPUs, such as one or more general purpose processors and/or one or more dedicated processors (e.g., application specific integrated circuits (ASICs), field programmable gate arrays (FPGAs), or digital signal processors (DSPs), etc.) Memory 804, in turn, may comprise volatile and/or non-volatile memory and can be integrated in whole or in part with processor 802.

Memory 804 preferably holds program instructions executable by processor 802, and data that is manipulated by these instructions to carry out various logic functions described herein. (Alternatively, the logic functions can be defined by hardware, firmware, and/or any combination of hardware, firmware and software.)

Communication interface 806 may take the form of a wireless link, and operate according to protocols based on, for example, OFDM, frequency hopping, or CDMA. However, other forms of physical layer connections and other types of standard or proprietary communication protocols may be used over communication interface 806. Furthermore, communication interface 806 may comprise multiple physical interfaces (e.g., multiple wireless transceivers). Regardless of the exact means of implementation, communication interface 806 is preferably capable of transmitting and receiving information between UAV 100 and one or more other manned or unmanned aircraft, and/or between UAV 100 and one or more ground control stations.

Sensors 808 facilitate the gathering of environmental information in the vicinity of UAV 100. Sensors 808 may comprise multiple types of sensing devices, such as video cameras acoustic sensors, motion sensors, heat sensors, wind sensors, RADAR, LADAR, EO sensors, IR sensors, and/or EO/IR sensors. Sensors 808 preferably can detect stationary or moving objects and obstacles based the visible and infrared light spectra, as well as based on such an object's acoustic emanations.

By way of example, memory 804 may comprise data representing at least one flight path of a different aircraft and data representing at least one flight corridor. Furthermore, memory 804 may comprise program instructions executable by the processor to calculate a first UAV flight plan to avoid the at least one flight plan and the at least one flight corridor and to store the first UAV flight plan in the memory, program instructions executable by the processor for the UAV to fly according to the first UAV flight plan, program instructions executable by the processor to calculate a second UAV flight plan based on the first UAV flight plan and input from a camera, and program instructions executable by the processor for the UAV to fly according to the second UAV flight plan.

Additionally, memory 804 may comprise program instructions executable by the processor to calculate a third UAV flight plan based on the second UAV flight plan and input from an acoustic sensor and program instructions executable by the processor for the UAV to fly according to the third UAV flight plan.

Furthermore, memory 804 may comprise program instructions executable by the processor to receive flight plan information from other UAVs or a ground control station via the wireless network interface, program instructions executable by the processor to calculate a third UAV flight plan based on the second UAV flight plan and the received flight plan information, and program instructions executable by the processor for the UAV to fly according to the third UAV flight plan.

Similar to the basic block diagram shown in FIG. 8, a ground control station may also comprise a processor, memory, and a communications interface linked by a bus. In an alternate embodiment, the multi-modal navigation logic used by a UAV, such as UAV 100, may be distributed between the UAV and such a ground control station. Thus, some navigational decisions may be made by the UAV, while other navigational decisions are made by the ground control station, or some combination of the UAV and the ground control station. Furthermore, such a UAV may be in contact with multiple ground control stations, and share decision-making capabilities with one or more of these ground control stations.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for navigation for an unmanned aerial vehicle (UAV) equipped with a processor, a camera, a wireless network interface and at least one acoustic sensor and a memory device storing data representing at least one flight corridor; and data representing at least one flight path, the method comprising:
    at the processor, calculating a first flight plan to avoid the at least one flight corridor and the at least one flight path,
        flying the UAV according to the first flight plan, calculating a second flight plan based on the first flight plan and input from multi-modal logic stored in the memory device based on signals received from the camera and at least one acoustic sensor and flying the UAV according to the second flight plan, wherein the camera detects navigational signals in the range of at least one of visible light or infrared light frequencies, and wherein the processor detects at the at least one acoustic sensor noise associated with an unknown aircraft;

at the wireless network interface, receiving information transmitted from at least one ground control station; and at the processor, calculating a third flight plan, based on the second flight plan and the information received from the ground control station and flying the UAV according to the third flight plan.

2. The method of claim 1, wherein the at least one flight corridor comprises a commercial aircraft flight corridor.

3. The method of claim 1, wherein the flight corridor comprises at least one of a waypoint, a vector, a width centered upon the vector, an altitude range, and a time range.

4. The method of claim 1, wherein the at least one flight path comprises a UAV flight path.

5. The method of claim 1, wherein the flight path comprises at least one of a waypoint, a vector, a width centered upon the vector, an altitude range, and a time range.

6. The method of claim 1, wherein the input from the camera indicates an obstacle to the first flight plan, and wherein the second flight plan avoids the obstacle.

7. The method of claim 1, wherein calculating a third flight plan comprises at least one of the UAV changing direction and the UAV changing speed compared to the second flight plan.

8. The method of claim 1, wherein the wireless network is a point to point network between the UAV and the friendly UAV.

9. The method of claim 1, wherein the wireless network is a broadcast network.

10. An unmanned aerial vehicle (UAV) comprising:
a processor;
a camera configured to detect navigational signals in the range of at least one of visible light or infrared light frequencies;
at least one acoustic sensor configured to sense acoustic signals;
a memory containing:
  data representing at least one flight path of a different aircraft;
  data representing at least one flight corridor;
  program instructions executable by the processor to calculate a first flight plan to avoid the at least one flight plan and the at least one flight corridor and to store the first flight plan in the memory;
  program instructions executable by the processor for the UAV to fly according to the first flight plan;
  multi-modal logic executable by the processor to calculate a second flight plan based on the first flight plan and input from the camera and at least one acoustic sensor; and
  program instructions executable by the processor for the UAV to fly according to the second flight plan,
wherein the UAV is capable of vertical takeoff and landing;
a wireless network interface; and
the memory further comprising:
  program instructions executable by the processor to receive flight plan information from other UAVs via the wireless network interface;
  program instructions executable by the processor to calculate a third flight plan based on the second flight plan and the received flight plan information; and
  program instructions executable by the processor for the UAV to fly according to the third flight plan.

11. The UAV of claim 10, wherein the UAV is a ducted fan UAV.

* * * * *